United States Patent
Kondo

(10) Patent No.: US 7,365,801 B2
(45) Date of Patent: Apr. 29, 2008

(54) APPARATUS AND METHOD FOR PROCESSING SIGNAL

(75) Inventor: Makoto Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 914 days.

(21) Appl. No.: 10/833,826

(22) Filed: Apr. 27, 2004

(65) Prior Publication Data

US 2004/0264802 A1 Dec. 30, 2004

(30) Foreign Application Priority Data

Apr. 28, 2003 (JP) ............................. 2003-124003

(51) Int. Cl.
*H04N 5/00* (2006.01)

(52) U.S. Cl. ...................................... 348/620; 348/701

(58) Field of Classification Search ................ 348/620, 348/619, 607, 699, 700, 622, 701, 669
See application file for complete search history.

(56) References Cited

U.S. PATENT DOCUMENTS 5,638,127 A * 6/1997 Murakami et al. ........ 348/412.1

6,034,734 A * 3/2000 De Haan et al. ............ 348/458

FOREIGN PATENT DOCUMENTS

| JP | 8 163410 | 6/1996 |
|----|----------|--------|
| JP | 2001 45335 | 2/2001 |

* cited by examiner

*Primary Examiner*—M. Lee
(74) *Attorney, Agent, or Firm*—Frommer Lawrence & Haug LLP; William S. Frommer; Thomas F. Presson

(57) ABSTRACT

A motion vector detection portion detects a motion vector based on an input image signal and an image signal of previous field that is one field before the input signal. A motion compensation portion performs motion compensation on the image signal of previous field using the motion vector to generate a motion-compensated image signal. A reference-image-setting portion selects as a reference image signal either the image signal of previous frame or the motion-compensated image signal. A selection control portion performs motion detection and selects as the reference image signal, the motion-compensated image signal in a motion region and the image signal of previous frame in a motionless region. A correction-processing portion detects a noise component from a difference between the input signal and the reference signal and corrects a signal level of the input signal corresponding to this noise component.

8 Claims, 7 Drawing Sheets

F I G. 1
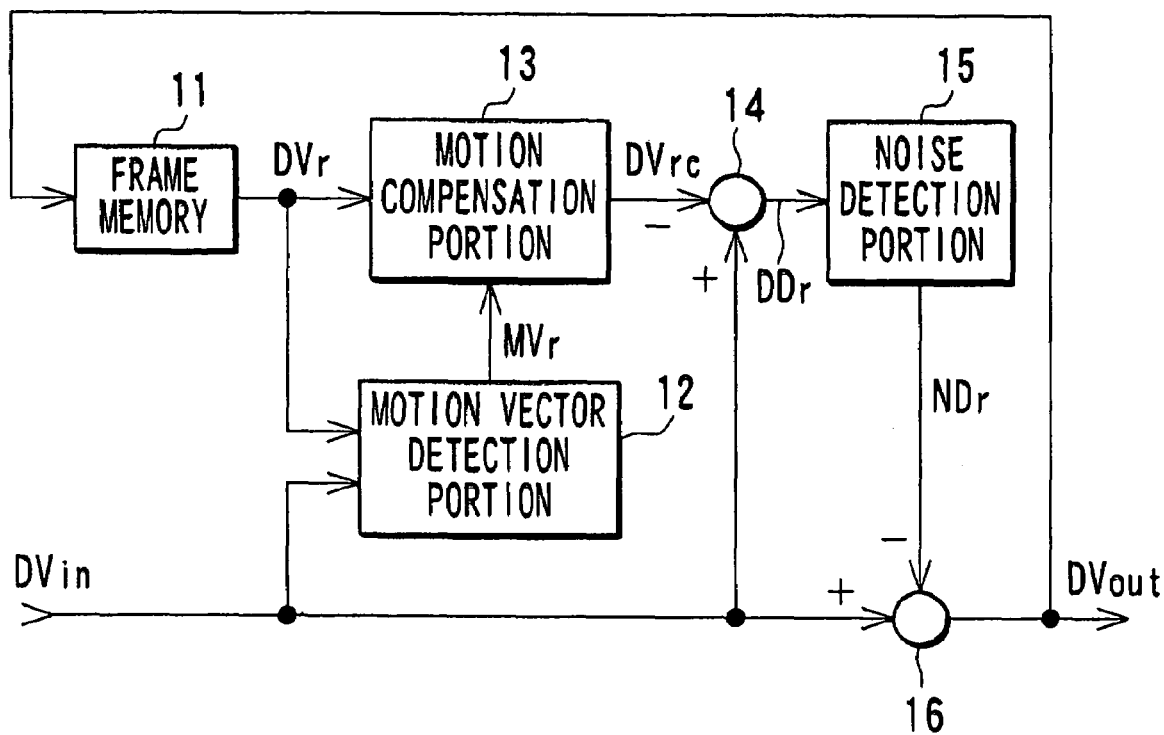

F I G. 6
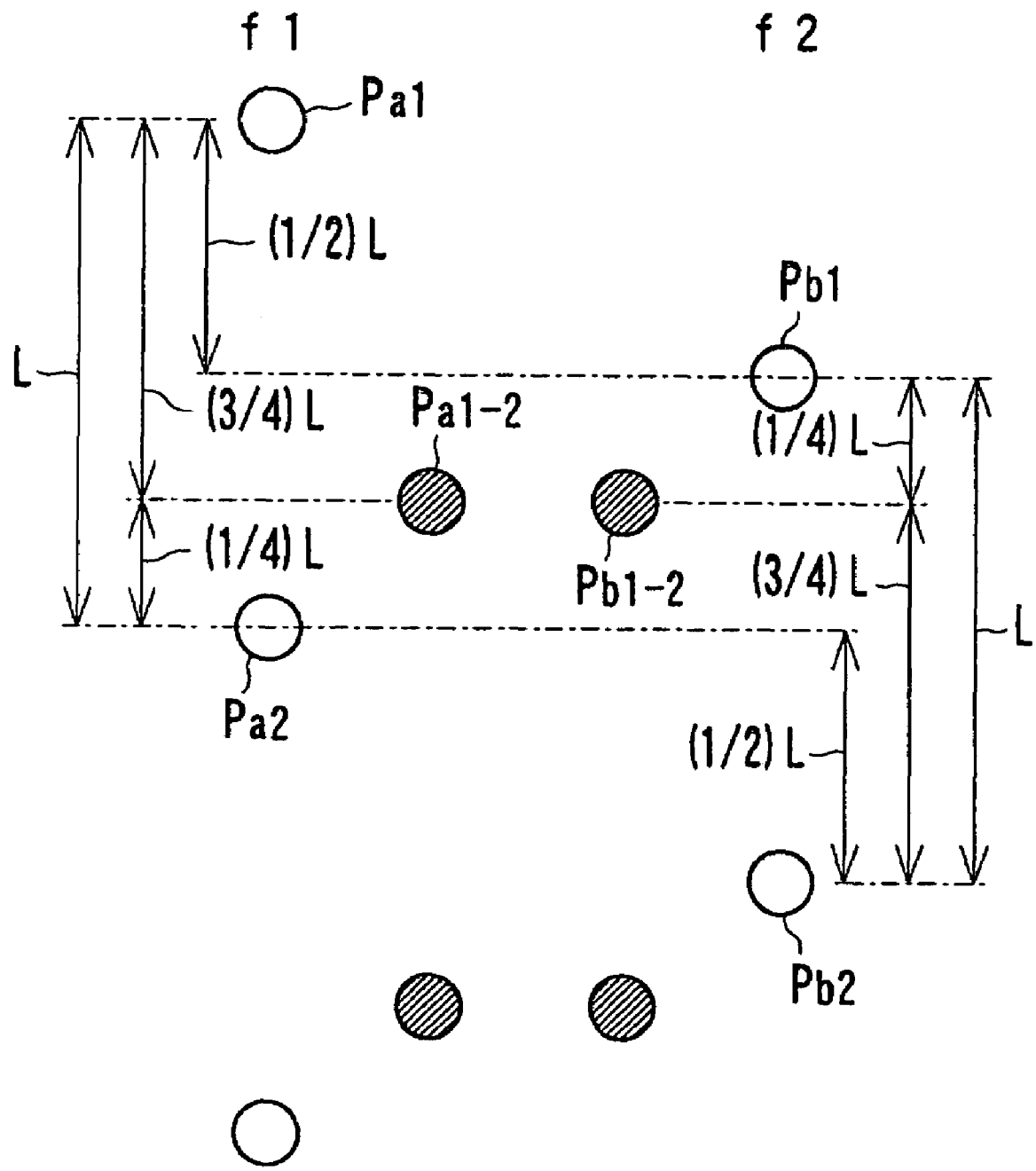

APPARATUS AND METHOD FOR PROCESSING SIGNAL

BACKGROUND OF THE INVENTION

1. Field of the Invention

The present invention relates to an apparatus and method for processing signal. More specifically, it relates to an apparatus and method for processing a digital image signal or the like to reduce an influence of noise from the digital image signal or the like.

2. Description of Related Art

As a signal processing apparatus for processing a digital image signal, for example, a signal processing apparatus for reducing an influence of noise from a digital image signal, a circulation-type noise-reducing device in which a field memory or a frame memory is used has been employed.

This type of noise-reducing device performs motion compensation by use of a motion vector on an image signal of previous frame that is stored in the frame memory, extracts a noise component from a difference between the image signal of previous frame as motion-compensated and an image signal of a current frame, and subtracts this extracted noise component from the image signal of current frame, thereby reducing noise.

In such the noise-reducing device, however, a motion vector must be detected between one frame and another, thus making a movement distance thereof larger than that of a case where a motion vector is detected between one field and another. Therefore, a search extent needs to be larger, thus increasing a circuit size.

Further, in another noise reducing device, a motion vector is detected between one field and another instead of thus inter-frame motion vector detection. Motion compensation is performed on an image signal of previous field using this detected motion vector. By extracting a noise component from a difference between an image signal of the previous field as motion-compensated and an image signal of a current field and subtracting this extracted noise component from the image signal of current field, noise is reduced.

According to the noise reducing device, however, there is a case where an influence of noise may have a vertical spread in s signal level. Further, the signal level fluctuates at the boundary may cause flickering display to occur.

SUMMARY OF THE INVENTION

It is an object of the present invention to provide an apparatus and method for processing signal, which reduce noise well without causing any malfunction and increasing a circuit size.

According to an aspect of the present invention, motion vector detector detects a motion vector using an input image signal and an image signal of previous field that is one field before the input image signal. This motion vector is then used in motion compensator to perform motion compensation on the image signal of previous field, thereby generating a motion-compensated image signal.

Reference-image-setting device selects as a reference image sign either an image signal of previous frame that is one frame before the input image signal or the motion-compensated image signal. Selection controller controls the selection by the reference-image-setting device.

In the controller, for example, a motion detection is performed for each pixel using the input image signal and the image signal of previous frame. In a motion image region in which a motion exists formed on the basis of a pixel or multiple pixels, the motion-compensated image signal is selected as a reference image signal.

Further, in a motionless region in which no motion exists formed on the basis of a pixel or multiple pixels, the image signal of previous frame is selected as the reference image signal.

Correction processor obtains a difference between the input image signal and the reference image signal, detects a noise component from the difference, and corrects a signal level of the input image signal corresponding to the noise component, thereby reducing noise.

According to another aspect of the present invention, in addition to the above, output processor generates an output image signal of a system different from that of the input image signal, for example, a progressive system, using the image signal of previous field, a result of the motion detection, and the image signal with reduced noise.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 1 is a block diagram for showing a configuration of a noise-reducing device;

FIG. 6 is a schematic representation for explaining operations of an interpolation filter.

DESCRIPTION OF THE PREFERRED EMBODIMENTS

Figure 2:
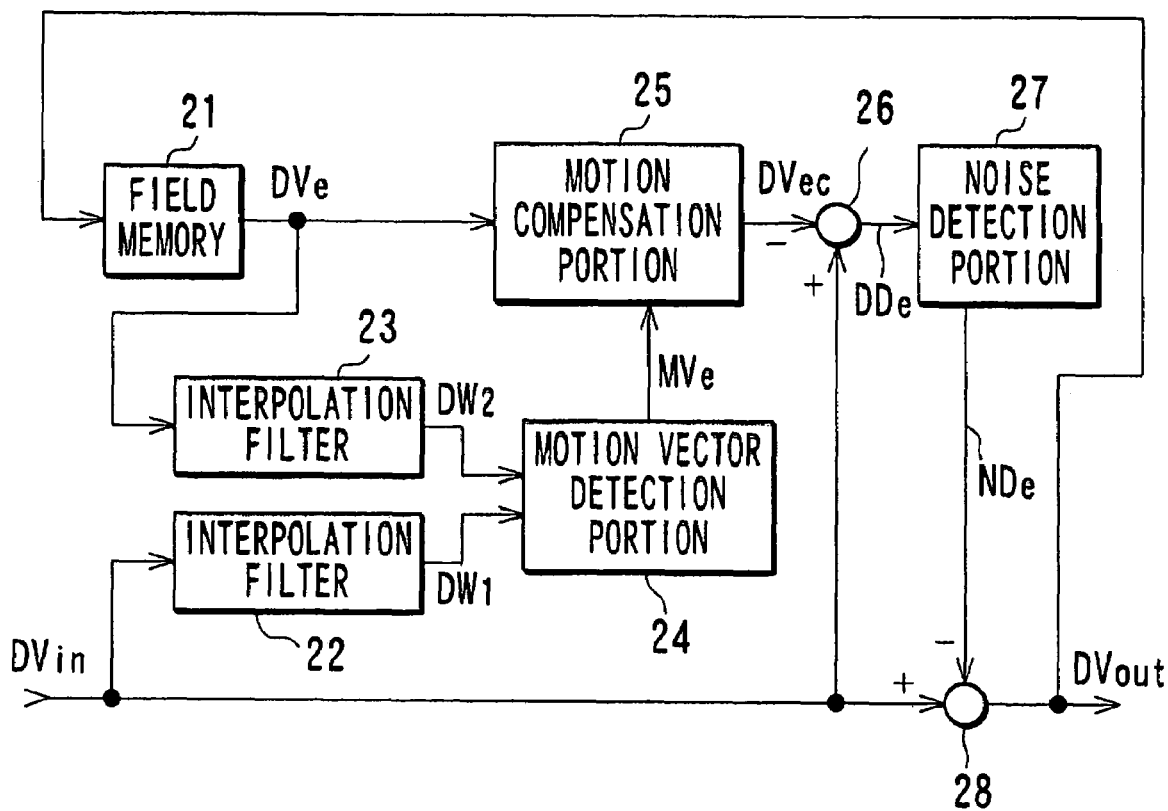
FIG. 2 is a block diagram for showing a configuration of another noise-reducing device.

FIG. 1 shows a configuration of a related noise-reducing device. In FIG. 1, a digital input image signal DVin is supplied to a motion vector detection portion 12 and subtracters 14 and 16. A frame memory 11 stores an image signal DVr of previous frame that is one frame before the input image signal DVin. The frame memory 11 supplies this image signal DVr of previous frame to the motion vector detection portion 12 and a motion compensation portion 13.

From the input image signal DVin and the image signal DVr of previous frame, the motion vector detection portion 12 detects a motion vector MVr of an image based on the input image signal DVin with respect to an image based on the image signal DVr of previous frame. The motion vector detection portion 12 supplies it to the motion compensation portion 13.

The motion correction portion 13 performs motion compensation using the motion vector MVr received from the motion vector detection portion 12 and moves an image based on the image signal DVr of previous frame to a position of an image based on the input image signal DVin. A signal performed motion compensation using this motion vector MVr is supplied as a motion-compensated image signal DVrc to the subtracter 14.

The subtracter 14 subtracts the motion-compensated image signal DVrc from the input image signal DVin to obtain difference signal DDr. The subtracter 14 then supplies the difference signal DDr thus obtained to a noise detection portion 15. The noise detection portion 15 detects a noise component from the difference signal DDr, generates a corrected signal NDr corresponding to a signal level of this noise component, and supplies it to the subtracter 16. The subtracter 16 subtracts the corrected signal NDr from the input image signal DVin to thereby generate an output image signal DVout having reduced noise and output it. Further, it supplies this output image signal DVout to the frame memory 11. It is to be noted that at the noise detection portion 15, if the difference signal DDr obtained at the subtracter 14 is supplied as the corrected signal NDr to the subtracter 16 and when a moving image portion is decided to be noise, correction that corresponds to a signal level of the motion image is performed to give rise to an after-image. Therefore, the after-image is prevented from becoming conspicuous by generating the corrected signal NDr by multiplying the difference signal DDr obtained at the subtracter 14 by a factor, for example, less than 1.

By thus extracting a noise component from a difference between the motion-compensated image signal DVrc and the input image signal DVin and subtracting this extracted noise component from the input image signal DVin, it is possible to obtain the output image signal DVout having reduced noise.

In such the noise-reducing device as shown in FIG. 1, however, a motion vector must be detected between one frame and another, thus making a movement distance thereof larger than that of a case where a motion vector is detected between one field and another. Therefore, a search extent needs to be larger, thus increasing a circuit size.

FIG. 2 shows a configuration of another related noise-reducing device in which a motion vector is detected between one field and another and used to reduce noise using this motion vector.

In FIG. 2, a digital input image signal DVin is supplied to an interpolation filter 22 and subtracters 26 and 28. A field memory 21 stores an image signal DVe of previous field that is one field before the input image signal DVin. The field memory 21 supplies this image signal DVe of previous field to an interpolation filter 23 and a motion compensation portion 25.

The interpolation filter 22 performs interpolation processing by use of the input image signal DVin to generate a first interpolated image signal DW1. The interpolation filter 23 performs interpolation 3 processing by use of an image signal DVe of previous field to generate a second interpolated image signal DW2 whose vertical spatial position is the same as that of the interpolated image signal DW1.

A motion vector detection portion 24 detects a motion vector MVe of an image based on the first interpolated image signal DW1 generated at the interpolation filter 22 with respect to an image based on the second interpolated image signal DW2 generated at the interpolation filter 23. The motion vector detection portion 24 then supplies it to the motion compensation portion 25.

The motion compensation portion 25 performs motion compensation using a motion vector MVe received from the motion vector detection portion 24 and moves an image based on the image signal DVe of previous field to a position of an image based on the input image signal DVin. A signal performed motion compensation using this motion vector MVe is supplied as a motion-compensated image signal DVec to the subtracter 26.

The subtracter 26 subtracts the motion-compensated image signal DVec from the input image signal DVin to obtain difference signal DDe. The subtracter 26 then supplies the difference signal DDe thus obtained to a noise detection portion 27. The noise detection portion 27 detects a noise component from the difference signal DDe, generates a corrected signal NDe that corresponds to this noise component, and supplies it to the subtracter 28. The subtracter 28 subtracts the corrected signal NDe from the input image signal DVin to generate an output image signal DVout. Further, it supplies this output image signal DVout to the field memory 21.

By detecting a motion vector between one field and another to perform motion compensation of a previous field, extracting a noise component from a difference between an image signal of the previous field as motion-compensated and an image signal of a current field, and subtracting this extracted noise component from the current field image signal, noise can be reduced.

Figure 3:
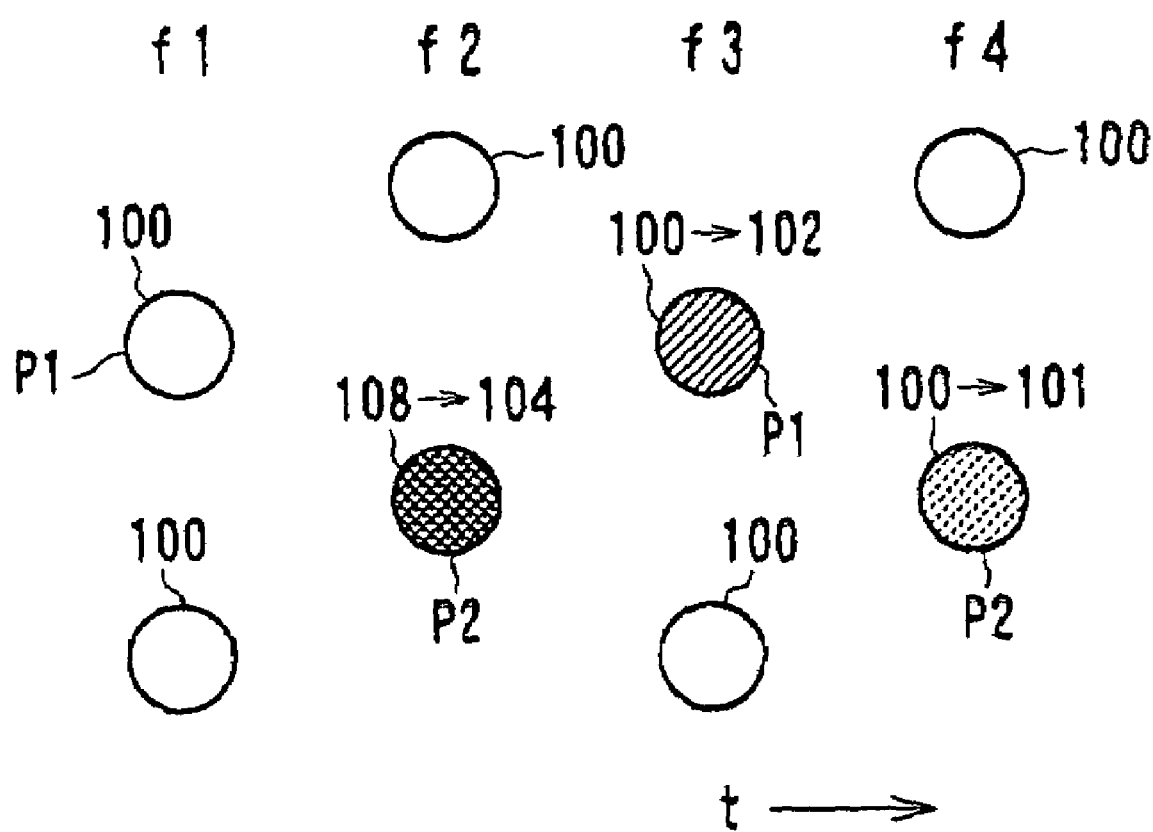
FIG. 3 is a schematic representation for explaining a spread of an influence based on the noise-reducing processing.

In the noise-reducing device shown in FIG. 2, however, there is a case where an influence of noise may have a vertical spread in s signal level. For example, the following will describe a case where, as shown in FIG. 3, a signal level of a pixel P1 in a field f1 is "100" and a signal level of a pixel P2 in a field f2 is changed to "108" when a noise component "8" is added to the signal of the pixel P2 in the field f2.

In this case, assuming that "0.5" time a signal level difference between one pixel and another is set as a correction quantity, that is, a signal level of a corrected signal, the corrected signal performs correction so that the signal level of the pixel P2 is subtracted by "4" because a signal level difference of the pixel P2 with respect to the pixel P1 is "8". Therefore, the signal level of the pixel P2 in the field f2 is corrected from "108" to "104" in accordance with the corrected signal. Next, since a signal level difference of the pixel P1 in a field f3 with respect to the pixel P2 in the field f2 is "100−104=−4", the corrected signal performs correction so that the signal level is increased by "2". Therefore, the signal level of the pixel P1 in the field f3 is corrected from "100" to "102". On the pixel P2 in a field f4 also, similar correction is performed, so that the signal level of the pixel P2 in the field f4 is corrected from "100" to "101". In such a manner, an influence of noise has a vertical spread in signal level.

Figure 4:
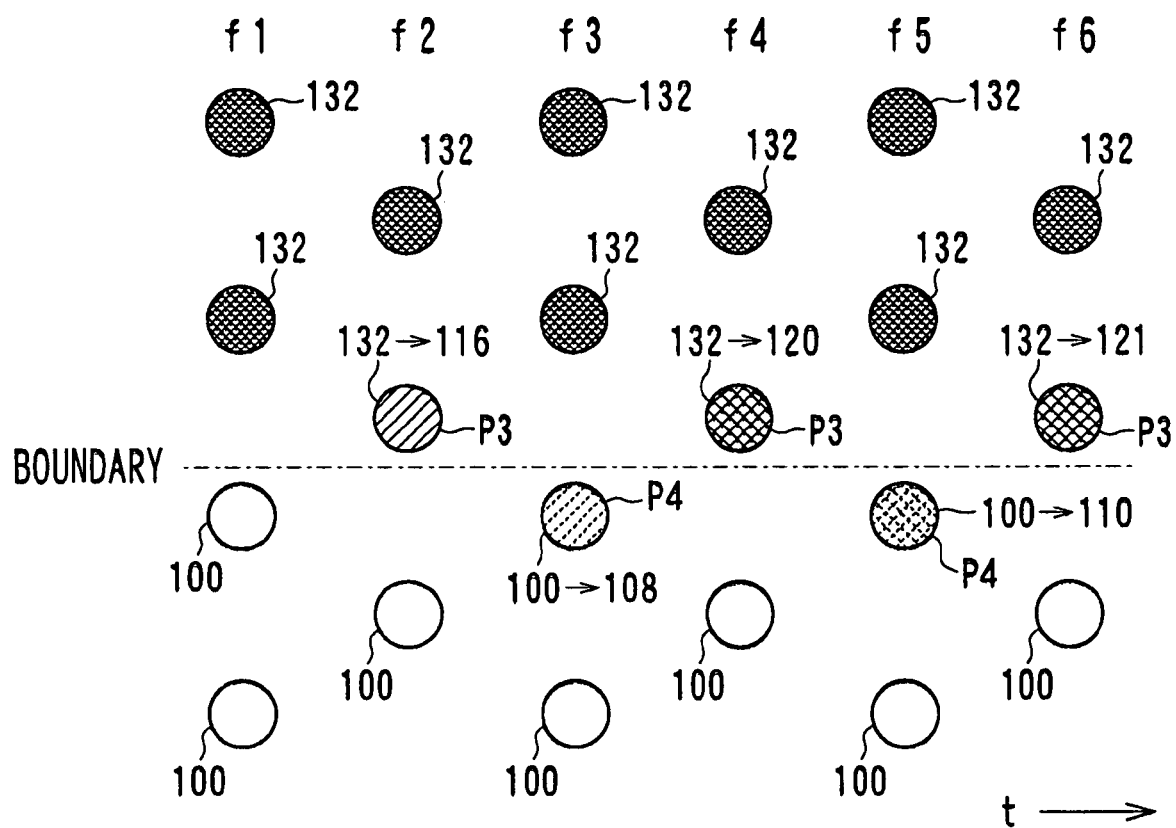
FIG. 4 is a schematic representation for explaining a malfunction at a boundary.

Further, at a boundary in a still picture as shown in FIG. 4, a malfunction occurs due to a reduction in noise. That is, the signal level of a pixel P3 in the field f2 is corrected from "132" to "116" and that of a pixel P4 in the field f3 is corrected from "100" to "108". Furthermore, the signal level of the pixel P3 in the field f4 is corrected from "132" to "120" and that of the pixel P4 in a field f5 is corrected from "100" to "110". Furthermore, the signal level of the pixel P3 in a field f6 is corrected from "132" to "121". In such a manner, the signal level fluctuates at the boundary causes flickering display to occur.

Figure 5:
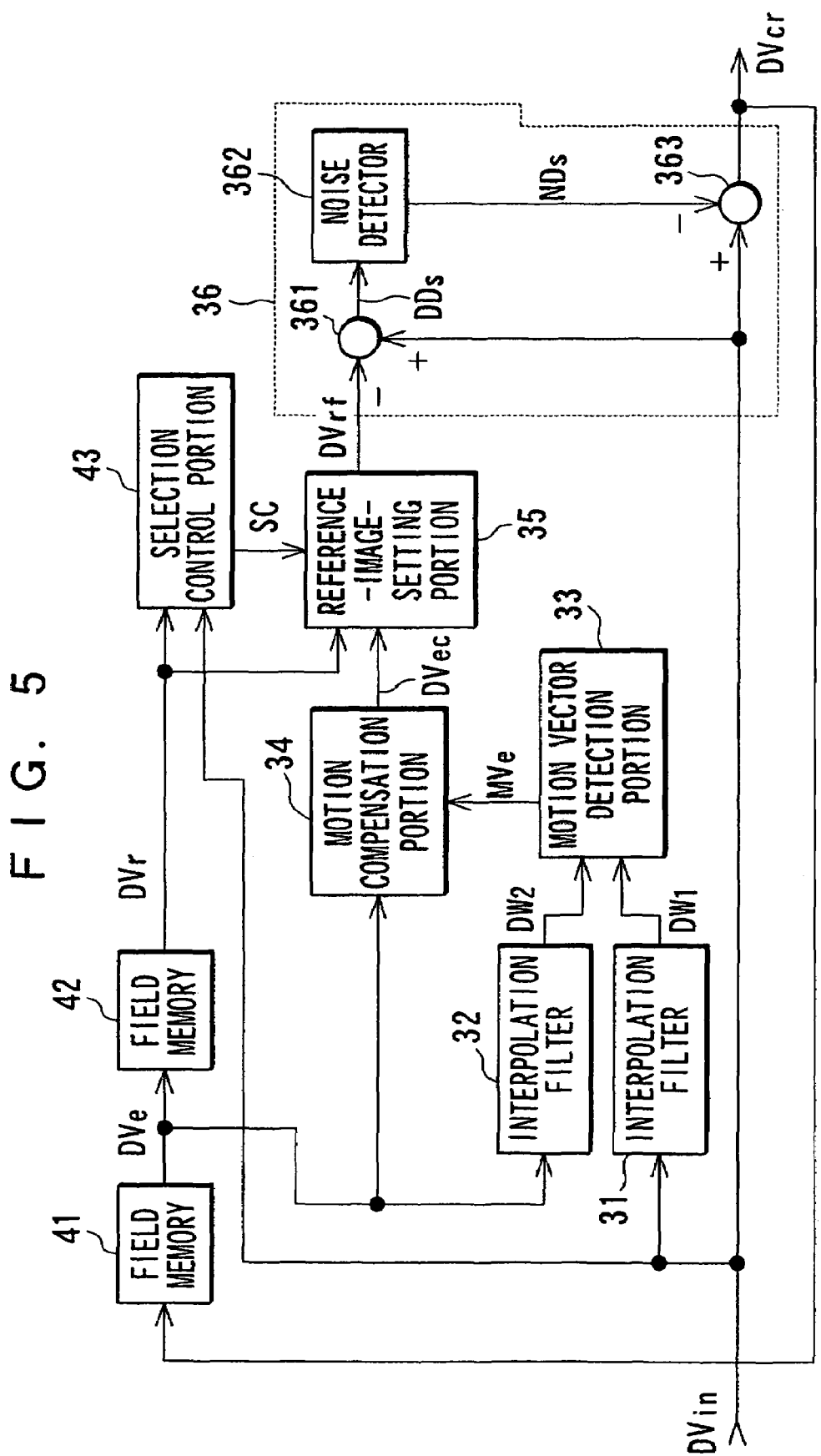
FIG. 5 is a block diagram for showing a configuration of an apparatus for processing signal as an embodiment according to the invention.

FIG. 5 shows a configuration of an apparatus for processing signal with reference to an embodiment according to the invention. A digital input image signal DVin is supplied to an interpolation filter 31, a correction-processing portion 36, and a selection control portion 43, respectively.

A field memory 41 stores an image signal DVcr received from the correction-processing portion 36, which will be described later. This image signal DVcr thus stored is obtained by reducing noise from an image signal that is one field before the input image signal DVin in timing. The field memory 41 supplies an image signal DVe stored in it (hereinafter referred to as "image signal of previous field") to an interpolation filter 32, a motion compensation portion 34, and a field memory 42.

The interpolation filter 31 performs interpolation processing by use of the input image signal DVin and the interpolation filter 32 performs interpolation processing by use of the image signal DVe of previous field. In such the interpolation processing, using vertically adjacent pixels in one field, that is, two successive lines, interpolated image signals whose vertical spatial position are the same in the two fields are generated.

FIG. 6 is a schematic representation for explaining operations of the interpolation filters 31 and 32. A pixel in a first field f1 and a pixel in a second field f2 are far away from each other by a distance of "($\frac{1}{2}$)L", where L is defined as a vertical distance (line distance) between the pixels.

The interpolation filter 31 generates a signal of a pixel Pa1-2 which is vertically distant, for example, from pixels Pa1 and pa2 in the first field f1 at a ratio of 3:1. That is, the pixel Pa1-2 is vertically distant from the pixels Pa1 and Pa2 by "($\frac{3}{4}$)L" and "($\frac{1}{4}$)L", respectively. Therefore, an interpolation factor is set so that signals of the respective pixels Pa1 and Pa2 can be added up at a ratio that corresponds to these distances. Thus, an interpolation factor of "$\frac{1}{4}$" is set to the pixel Pa1 and that of "$\frac{3}{4}$" is set to the pixel Pa2. Then, the signals of the pixels Pa1 and Pa2 are multiplied by the respective interpolation factors and added up to thereby obtain the signal of the pixel Pa1-2.

The interpolation filter 32, on the other hand, generates a signal of a pixel Pb1-2 which is vertically distant, for example, from pixels Pb1 and Pb2 in a second field f2 at a ratio of 1:3. That is, the pixel Pb1-2 is vertically distant from the pixels Pb1 and Pb2 by "($\frac{1}{4}$)L" and "($\frac{3}{4}$)L", respectively. Therefore, an interpolation factor is set so that signals of the respective pixels Pb1 and Pb2 can be added up at a ratio that corresponds to these distances. Thus, an interpolation factor "$\frac{3}{4}$" is set to the pixel Pb1 and that of "$\frac{1}{4}$" is set to the pixel Pb2. Then, the signals of the pixels Pb1 and Pb2 are multiplied by the respective interpolation factors and added up to obtain the signal of the pixel Pb1-2.

By thus using the interpolation filters 31 and 32 to weight the signals of the pixels and add them up, interpolated signals whose vertical spatial positions are the same in the two fields are generated for each of the fields. A first interpolated image signal DW1 generated at this interpolation filter 31 is supplied to a motion vector detection portion 33. A second interpolated image signal DW2 generated at the interpolation filter 32, on the other hand, is supplied to a motion vector detection portion 33.

The motion vector detection portion 33 detects a motion vector MVe of an image based on the input image signal DVin with respect to an image based on the image signal DVe of previous field from the first interpolated image signal DW1 and the second interpolated image signal DW2. The motion vector detection portion 33 then supplies the motion vector MVe to a motion compensation portion 34. To detect this motion vector MVe, various methods are available such as a block matching method for deciding a position having a highest correlation as moving a search-target block to thereby detect a motion vector, and a spatial gradient method for approximating a motion vector based on a gradient equation which indicates a spatial gradient of a luminance to thereby obtain a motion vector-that gives successful matching for each pixel.

The motion compensation portion 34 performs motion compensation on the image signal DVe of previous field by use of the motion vector MVe received from the motion vector detection portion 33 to obtain a motion-compensated image signal DVec. The motion compensation portion 34 then supplies the motion-compensated image signal DVec thus obtained after this motion compensation to a reference-image-setting portion 35.

The above-mentioned interpolation filter 32 and the field memory 42 receive the image signal DVe of previous field from the field memory 41. It is to be noted that an image signal (hereinafter referred to as "image signal of previous frame"), which is one-frame period before the input image signal DVin, is stored in the field memory 42. This image signal DVr of previous frame is supplied to the reference-image-setting portion 35 and the selection control portion 43.

The reference-image-setting portion 35 selects as a reference image signal DVrf either the image signal DVr of previous frame or the motion-compensated image signal DVec based on a control signal SC received from the selection control portion 43. Then, it supplies the reference image signal DVrf to a subtracter 361 in the correction-processing portion 36.

The selection control portion 43 generates the control signal SC required to select either the image signal DVr of previous frame or the motion-compensated image signal DVec as the reference image signal DVrf. Then, it supplies the generated control signal SC to the reference-image-setting portion 35. For example, the selection control portion 43 performs a motion detection using the input image signal DVin and the image signal DVr of previous frame. Based on a result of this motion detection, the selection control portion 43 distinguishes between a motion image region in which a motion exists and a motionless image region in which no motion exists. Furthermore, based on a result of this region distinguishing, the selection control portion 43 generates the control signal SC so that the reference-image-setting portion 35 selects the motion-compensated image signal DVec to set it as the reference image signal DVrf for the motion image region and selects the image signal DVr of previous frame to set it as the reference image signal DVrf for the motionless image region. The selection control portion 43 then supplies the control signal SC to the reference-image-setting portion 35.

It is to be noted that a motion is detected for each pixel, so that the motion image region and the motionless image region are distinguished from each other on the basis of a pixel or multiple pixels. For example, a result of the motion detection for each pixel is used as it is to select a pixel that has been motioned as a motion image region and a pixel that has not been motioned as a motionless image region. Such the processing allows a signal to be selected corresponding to a result of the motion detection. It is also possible to select either the image signal of previous frame or the motion-compensated image signal in accordance with whether the same result of the motion detection has continued over a predetermined number of pixels or whether pixels selected as a motion portion are contained, at least at a predetermined ratio in a region having a predetermined pixel size. This prevents a signal to be selected from being switched frequently.

It is to be noted that noise quantity determination means or device for determining a quantity of noise of the input image signal DVin for each field may be provided so that the selection control portion 43 can control signal selection for each field in the reference-image-setting portion 35 based on a result of determination by the noise quantity determination means or device. In this case, for a field having a noise quantity in excess of a predetermined quantity, the image signal of previous frame is selected. By thus selecting the signal, it is possible to obtain a sufficient effect of reducing noise for a still region by selecting the image signal of previous frame as the reference image signal, even if such a case occur that a proper motion-compensated signal cannot be obtained because a noise quantity is too large.

The subtracter 361 subtracts the reference image signal DVrf, which provides a reference in noise detection, from the input image signal DVin to obtain a difference signal DDs. The subtracter 361 then supplies the difference signal DDs thus obtained to a noise detector 362. The noise detector 362 detects a noise component from the difference signal DDs, generates a corrected signal NDs required to reduce this detected noise component, and supplies it to a subtracter 363. The subtracter 363 subtracts the corrected signal NDs from the input image signal DVin to generate an image signal DVcr having reduced noise, outputs this image signal DVcr, and supplies it to the field memory 41.

Thus, either the motion-compensated image signal DVec or the image signal DVr of previous frame is selected and used as the reference image signal DVrf, which provides a reference in noise detection, based on the input image signal DVin. In a still picture portion in an image, selecting the image signal DVr of previous frame as the reference image signal DVrf for noise reduction prevents malfunctioning at a boundary owing to noise and vertical spreading of its influence from occurring and allows the noise to be properly reduced. Further, in a moving picture portion in an image, selecting the motion-compensated image signal DVec as the reference image signal DVrf for noise reduction allows noise reduction processing to be performed for a better response. It is also possible to reduce noise properly without a motion in the image being decided to be noise mistakenly.

In signal processing of the input image signal DVin, a variety of processing items are performed using a result of motion detection, the input image signal, the image signal of previous field, etc. Therefore, utilizing the field memory and/or the selection control portion for detecting motions, which are formed of a noise-reducing device, also in other signal processing prevents a circuit size from becoming large when performing a plurality of signal processing items including noise processing.

Figure 7:
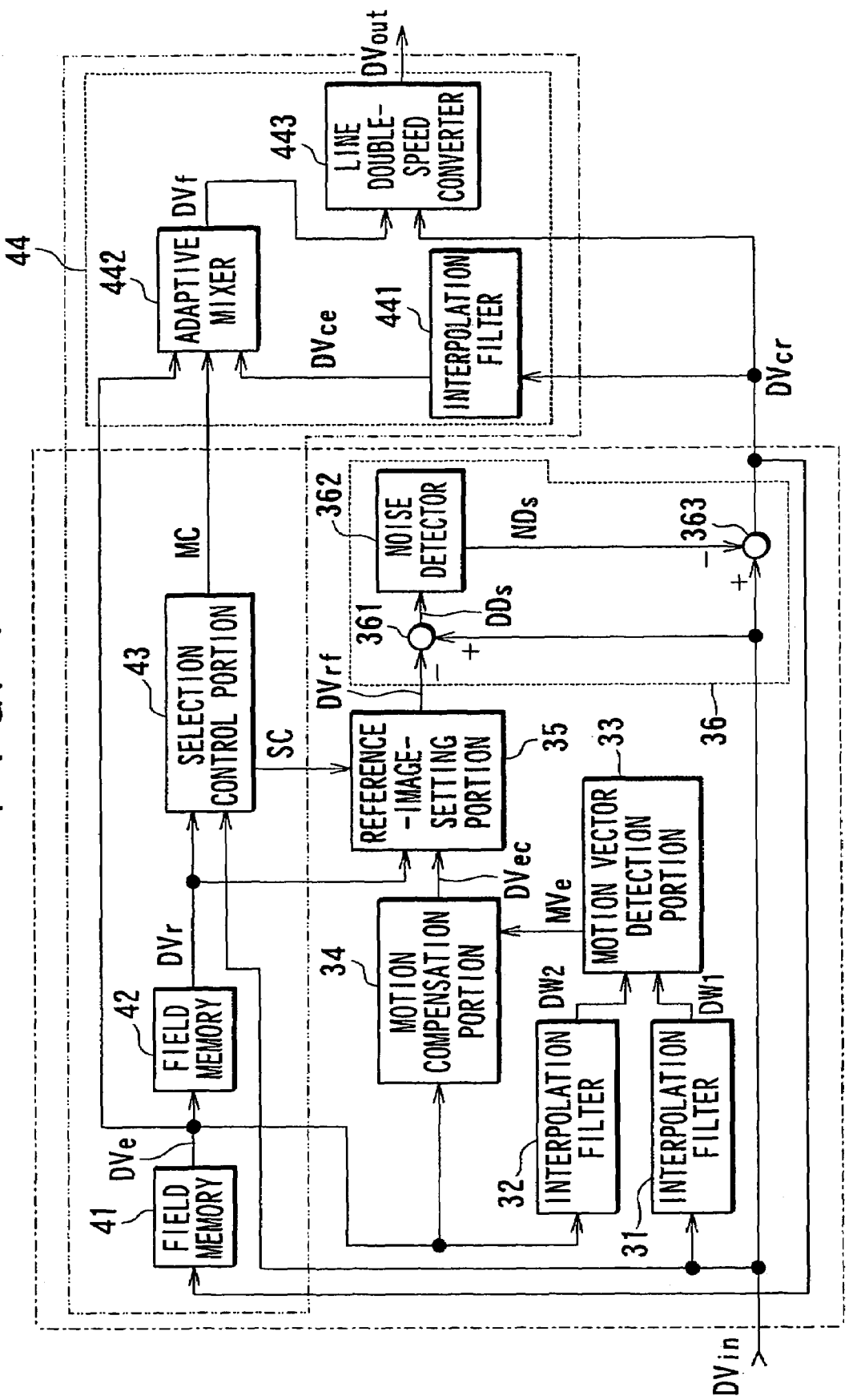
FIG. 7 is a block diagram for showing a configuration of an apparatus for processing signal as another embodiment according to the invention.

FIG. 7 shows a configuration of an apparatus for processing signal as another embodiment according to the invention, which is capable of performing noise reduction and system conversion processing (e.g., interlace progressive conversion processing). It is to be noted that in FIG. 7, a portion enclosed by a one-dot-and-dash line is adapted to this noise reduction processing, and its explanation is omitted. A portion enclosed by a two-dots-and-dash line, on the other hand, is adapted to the interlace progressive conversion processing.

The image signal DVe of previous field transferred from the field memory 41 is supplied to an adaptive mixer 442 in an output-processing portion 44. The selection control portion 43 performs a motion detection using the input image signal DVin and the image signal DVr of previous frame and supplies a result of this motion detection MC to the adaptive mixer 442.

The image signal DVcr transferred from the correction-processing portion 36 is supplied to an interpolation filter 441 and a line double-speed converter 443. At the interpolation filter 441, from image signals of adjacent two lines in one field, an image signal DVce at a line position in another field is generated using the image signal DVcr. For example, an average value of vertically successive two pixels is calculated to provide a new signal, thereby generating an image signal at a line position in another field. By performing such the interpolation processing in the interpolation filter 441, the newly generated image signal DVce is supplied to the adaptive mixer 442.

The adaptive mixer 442 generates an interpolated image signal DVf at a line position in a field different from that of the image signal DVcr having reduced noise depending on a result of the motion detection using the image signal DVe of previous field received from the field memory 41 and the image signal DVce received from the interpolation filter 441. For example, if the interpolated signal DVf is provided using the image signal DVce as it is at a portion indicated to be motionless by a result of the motion detection, a vertical resolution decreases when an output image signal DVout of the progressive system is generated using this interpolated image signal DVf. Therefore, using the image signal DVe of previous field as the interpolated image signal DVf prevents the vertical resolution from decreasing. If the interpolated image signal DVf is provided using the image signal DVe of previous field as it is at a portion where a motion is detected, on the other hand, interference of a double image may occur when the output image signal DVout of the progressive system is generated using this interpolated image signal DVf. Therefore, outputting the image signal DVce received from the interpolation filter 441 as the interpolated image signal DVf prevents double-image interference from occurring. Furthermore, the adaptive mixer 442 may not only switch between the image signal DVce and the image signal DVe of previous field and output it, but also add up the two signals at a mixing ratio that corresponds to a result of motion detection, thereby generating the interpolated image signal DVf with it being adapted to the result of motion detection. The interpolated image signal DVf generated by this adaptive mixer 442 is supplied to the line double-speed converter 443.

The line double-speed converter 443 alternately reads the image signal DVcr received from the correction-processing portion 36 and the interpolated image signal DVf received from the adaptive mixer 442 at a double speed, thereby generating and providing the output image signal DVout of the progressive system.

By thus using the field memory and the selection control portion for motion detection commonly in noise reduction processing and system conversion processing, a necessity of providing a circuit for each processing can be eliminated, thereby making a circuit size smaller than that of a case where the circuits are provided for each processing.

Thus has been described an apparatus and method for processing an image signal to reduce an influence of noise from the image signal. While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An apparatus for processing signal comprising:
    motion vector detector for detecting a motion vector using an input image signal and an image signal of previous field that is one field before the input image signal in timing;
    motion compensator for performing motion compensation on the image signal of previous field using the motion vector to generate a motion-compensated image signal;
    reference-image-setting device for selecting any one of an image signal of previous frame that is one frame before the input image signal and the motion-compensated image signal, and for setting the selected image signal as a reference image signal;
    selection controller for controlling selection by the reference-image-setting device; and
    correction processor for obtaining a difference between the input image signal and the reference image signal, detecting a noise component from the difference, and correcting a signal level of the input image signal corresponding to the noise component.

2. The apparatus according to claim 1, wherein the selection controller performs motion detection using the input image signal and the image signal of previous frame, distinguishes between a motion image region in which a motion exists and a motionless image region in which no motion exists based on a result of the motion detection, and controls a selection of the reference image signal in the reference-image-setting device to select the motion-compensated image signal in the motion image region and the image signal of previous frame in the motionless image region.

3. The apparatus according to claim 2, wherein the selection controller-performs motion detection for each pixel and distinguishes between the motion image region and the motionless image region on the basis of any one of a pixel and multiple pixels.

4. The apparatus according to claim 2, further comprising output processor for generating an output image signal of a system different from that of the input image signal using the image signal of previous field, a result of the motion detection, and an image signal output from the correction processor.

5. A method for processing signal, the method comprising:
- a motion vector detection step of detecting a motion-vector using an input image signal and a image signal of previous field that is one field before the input image signal in timing;
- a motion compensation step of performing motion compensation on the image signal of previous field using the motion vector to generate a motion-compensated image signal;
- a reference-image-setting step of selecting any one of an image signal of previous frame that is one frame before the input image signal and the motion-compensated image signal, and for setting the selected image signal as a reference image signal;
- a selection control step of controlling selection in the reference-image-setting step; and
- a correction-processing step of obtaining a difference between the input image signal and the reference image signal, detecting a noise component from the difference, and correcting a signal level of the input image signal corresponding to the noise component.

6. The method according to claim 5, wherein in the selection control step, motion detection is performed using the input image signal and the image signal of previous frame; wherein a motion region in which a motion exists and a motionless region in which no motion exists are distinguished on the basis of a result of the motion detection; and wherein a selection of the reference image signal is controlled in the reference-image-setting step to select the motion-compensated image signal in a case of the motion region and the image signal of previous frame in a case of the motionless region.

7. The method according to claim 6, wherein in the selection control step, motion detection is performed for each pixel, and the motion image region and the motionless image region are distinguished on the basis of any one of a pixel and multiple pixels.

8. The method according to claim 6, further comprising an output-processing step for generating an output image signal of a system different from that of the input image signal using the image signal of previous field, a result of motion detection, and an image signal corrected during the correction-processing step.

* * * * *